Figure 1:
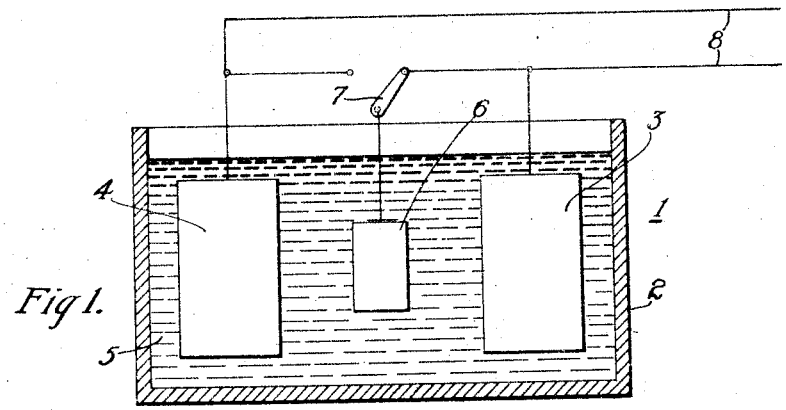

March 4, 1924.                C. T. ALLCUTT                1,485,358
                          ELECTROLYTIC CONDENSER
                          Filed Dec. 30, 1919

WITNESSES:                                    INVENTOR
H.T. Shelhamer                             Chester T. Allcutt
O.E. Bee.                                       BY
                                           Wesley G. Carr
                                               ATTORNEY Patented Mar. 4, 1924.

1,485,361

UNITED STATES PATENT OFFICE.

RICHARD BAUCH, OF BERLIN-CHARLOTTENBURG, GERMANY, ASSIGNOR TO SIEMENS-SCHUCKERTWERKE GESELLSCHAFT MIT BESCHRÄNKTER HAFTUNG, OF SIEMENS-STADT, NEAR BERLIN, GERMANY, A GERMAN CORPORATION.

MEANS FOR SUPPRESSING THE GROUND CURRENTS.

Application filed July 6, 1921. Serial No. 482,840.

(GRANTED UNDER THE PROVISIONS OF THE ACT OF MARCH 3, 1921, 41 STAT. L., 1313.)

*To all whom it may concern:*

Be it known that I, RICHARD BAUCH, a citizen of the German Empire, residing at Berlin-Charlottenburg, Germany, have invented certain new and useful Improvements in Means for Suppressing the Ground Currents, of which the following is a specification.

The method of grounding the neutral point of transformers and the like through choking coils is well known, as is also the fact, that by this means it is possible to suppress the ground current. The use of such earth choking coils, however, involves certain drawbacks such as the difficulty of adapting such coils to the variable conditions of the system.

My invention refers to an arrangement for suppressing the ground current of high tension systems, this being effected by connecting to the lines of the system a transformer, whose primary winding is star-connected in multiphase systems, and by grounding the neutral point of the primary winding directly without inserting choking coils. The secondary windings of the transformer, which are connected in series, are either short-circuited or closed over a resistance, which may be variable. The secondary winding reduces the inductance of the primary winding, resulting from the combined action of the primary and secondary fields, in regard to the working inductance so as to give the current going to earth from the neutral point of the transformer the approximate value of the ground-current. In multiphase systems the secondary winding is preferably connected in delta-connection.

By means of the variable resistance inserted in the secondary winding the transformer may now be easily adapted to the varying conditions of the system. In order to prevent in the case of earth connection the strong magnetic flux arising in the coils of the undamaged part of the system, from passing through the short-circuited coil, it is advisable to provide a separate branch, besides the branches of the phase coils, over which branch the magnetic flux will close. Now, although the magnetic flux is quite considerable, it cannot produce any E. M. F. in the coil short-circuited through earth, and, therefore, the E. M. F. in the latter coil may be as near zero as the reciprocal action of the secondary coil and the short-circuited primary coil permit. This effect may also be attained by the use of a shell transformer.

In case the line charging current—the ground current—be displaced against the E. M. F. at the transformer by not exactly 90°, and if the charging current be displaced, through the electrical conditions at the ground-transformer, by 90°, the phase displacement between the respective star voltage and the E. M. F. induced by the charging current is 180°, increased or reduced by a certain difference. For neutralizing the ground current the phase displacement is required to be exactly 90° or as near this value as possible, and my invention removes this difference in a particular manner by inserting in the circuit of the secondary coil a variable self-induction or a capacity or both.

My invention is illustrated in the accompanying drawings in which—

Figures 2, 3:
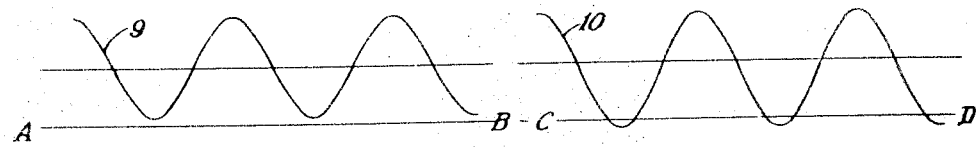

Figures 1 and 2 diagrammatically represent as examples two different forms in which my invention may be reduced to practice.

Referring to Figure 1, the out-going lines of transformer 11 are grounded over the primary coils 12, 13, 14 of the grounding transformer, the secondary delta-connected coils 15, 16, 17 being closed through the variable inductive resistance. In the circuit of the secondary coil there may be included, besides an inductance 18, an ohmic resistance. The inductance or capacity in the secondary circuit produce therein a current which leads or lags in regard to the secondary E. M. F. and which influences as in every other transformer, the phase position in the primary current and consequently also the phase displacement between the primary current and the primary E. M. F.

Besides the short-circuited compensating coil the transformer may be provided with a further secondary winding, which renders possible the use of the transformer for any other purposes.

During regular working no current flows through the earth wire, and magnetizing cur-

the partial capacity of the conductors against earth is compensated and, in the case of grounding, the current at the defect in insulation is compensated without any further auxiliary means. A characteristic feature is that, under normal-working conditions, the neutral point connection is a connection of points of equal potential, i.e. it is current-less whilst in the case of grounding it is charged with the compensating current resulting from the voltage-displacement in the three secondary windings of the transformer. In order to adjust this current to the proper value, it is necessary to have inductances of suitable value and to provide a magnetic compensating line, e. g. a fourth branch.

If with an installation as described above the system is loaded by dynamos or other working inductances to such a degree that part of the required compensation is effected by the latter, it may occur that the inductances star-connected to the secondary winding are not required for regular work. If they were cut out, the compensation of grounding through a defect in insulation would naturally be neutralized thereby. In order to protect the installation as required in this case, means for changing over these inductances may be provided according to my invention, at the arrangement above described.

This changing over is preferably effected so as to connect the inductances in parallel or series to the open star-connected auxiliary winding of the transformer. If the ratio of transmission between the various windings be correctly adjusted, the compensating effect required can be obtained with certainty for any connection mentioned and also for other possible connections.

It is, of course, also possible with the first mentioned loading of the secondary winding by means of star-connected inductances to insert corresponding choking coils in the circuit of the delta-connected winding, thereby causing the compensating effects described to be produced simultaneously.

I claim:

1. System for suppressing accidental grounding currents occurring in high tension alternating current systems, comprising a transformer having its primary winding connected to the system and the neutral point of said winding connected directly to ground, and having its secondary winding electrically loaded to a sufficient extent so that, in case of accidental grounding of the system, the current passing from said neutral point to ground approximates the value of the accidental ground current, whereby the inductance acting counter to the accidental ground current is considerably smaller than the working inductance of the system.

2. System for suppressing accidental grounding currents in multiphase high tension alternating current systems, comprising a transformer having its primary winding star-connected to the system and having the neutral point of said winding connected directly to ground, and having its secondary winding arranged in delta fashion and a loading resistance of suitable value connected to said secondary winding to electrically load it to a sufficient extent so that, in case of accidental grounding of the system, the current passing from said neutral point to ground approximates the value of the accidental ground current, whereby the inductance acting counter to the accidental ground current is considerably smaller than the working inductance of the system.

3. System for suppressing accidental grounding currents occurring in high tension alternating current systems, comprising a transformer having its primary winding connected to the system and the neutral point of said winding connected directly to ground, a variable resistance of suitable character and value connected to its secondary winding to adapt said transformer to the varying conditions of the high tension system, so that, in case of accidental grounding of the system, the current passing from said neutral point to ground approximates the value of the accidental ground current, whereby the inductance acting counter to the accidental ground current is considerably smaller than the working inductance of the system.

4. System for suppressing accidental grounding currents occurring in high tension alternating current systems, comprising a transformer having its primary winding connected to the system and the neutral point of said winding connected directly to ground and having its secondary winding electrically suitably loaded to cause the transformer to compensate at least some of the charging currents of the entire high tension system.

5. System for suppressing accidental grounding currents occurring in high tension alternating current systems, comprising a transformer having its primary winding connected to the system and the neutral point of said winding connected directly to ground, and having its secondary winding electrically loaded to a sufficient extent so that, in case of accidental grounding of the system, the current passing from said neutral point to ground approximates the value of the accidental ground current, whereby the inductance acting counter to the accidental ground current is considerably smaller than the working inductance of the system, and an additional secondary coil on said transformer, suitably dimensioned to supply working current for consumption.

In testimony whereof I affix my signature.

RICHARD BAUCH.